No. 873,898. PATENTED DEC. 17, 1907.
P. RUDOLPH & E. WANDERSLEB.
TELEPHOTOGRAPHIC OBJECTIVE.
APPLICATION FILED MAR. 2, 1906.
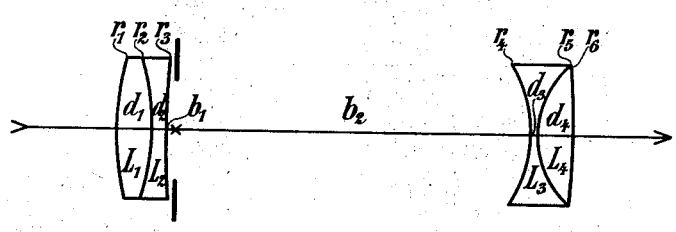
Witnesses
Paul Krüger
Fritz Sander
Inventor:
Paul Rudolph
Ernst Wandersleb.

UNITED STATES PATENT OFFICE.

PAUL RUDOLPH AND ERNST WANDERSLEB, OF JENA, GERMANY, ASSIGNORS TO THE FIRM OF CARL ZEISS, OF JENA, GERMANY.

TELEPHOTOGRAPHIC OBJECTIVE.

No. 873,898.　　　　Specification of Letters Patent.　　　　Patented Dec. 17, 1907.

Application filed March 2, 1906. Serial No. 303,818.

*To all whom it may concern:*

Be it known that we, PAUL RUDOLPH, doctor of philosophy, and ERNST WANDERSLEB, doctor of philosophy, both citizens of the German Empire, residing at Carl Zeiss strasse, Jena, in the Grand Duchy of Saxe-Weimar, Germany, have invented a new and useful Telephotographic Objective, of which the following is a specification.

The invention consists in an improvement upon an old tele-photographic objective or "tele-objective," in which not only the front, positive, element having the longer focal length but also the back, negative, element having the shorter focal length consists of two cemented lenses, each double lens being not only chromatically, but also spherically corrected. The said objective has the drawback, that it is strongly distortive. The present improvement has the removal of this error of distortion in view. This end is attained by spherically correcting the system as a whole, not each element individually, that is to say, by apportioning the spherical aberration of the two double lenses, so that each retains the like error in sign and order of magnitude proper to a simple lens having the same focal length, with the result that the opposite errors approximately compensate each other. The beneficial influence of this modified kind of spherical correction upon distortion depends principally upon the necessary modification of the negative double lens.

In objective systems, which are likewise composed of a front positive element and a back negative element, but which do not belong to the class known as tele-objectives, because their elements lie at but a small interval apart and the negative element has the greater focal length, it is known to give to the two elements likewise spherical aberration of opposite sign. But in the positive double lens, the standard element of the objective, the spherical aberration is not solely approximately that of a simple collective lens, as is the case in the subject of the present invention, but it is intentionally brought to a relatively high amount by giving a collective power to the cemented surface. Were it desired to introduce this high amount of spherical aberration also into the positive element of a tele-objective, then, in order to compensate it, the negative element would have to be given very deep curvatures, in other words, the negative double lens would be very difficult to produce.

In the annexed drawing a tele-objective constructed according to the invention is represented.

In the following example corresponding to the drawing, the focal length of the combination is 1000 mm. and the relative aperture 1 : 12.5. The value $\gamma$ stands for the quotient obtained from the focal lengths of the elements. The refractive indices $n_D$ and $n_{G1}$ refer to the D line of the solar, and the $H\gamma$ line of the hydrogen, spectrum.

Spherically, astigmatically and chromatically corrected tele-objective, with the positive element and the negative element each consisting of two cemented lenses. $\gamma = 2.5$.

| Radii. | Thicknesses and Distances. |
|---|---|
| $r_1 = + 156.8$ | $d_1 = 20.6$ |
| $r_2 = - 142.8$ | $d_2 = 8.6$ |
| $r_3 = +1140.0$ | $b_1 = 3.3$ |
| $r_4 = - 76.7$ | $b_2 = 211.0$ |
| $r_5 = + 55.5$ | $d_3 = 5.1$ |
| $r_6 = - 777.2$ | $d_4 = 20.6$ |

Kinds of Glass.

| | $n_D$ | $n_{G1} - n_D$ |
|---|---|---|
| $L_1$: | 1.59133 | 0.01229 |
| $L_2$: | 1.62350 | 0.02107 |
| $L_3$: | 1.62105 | 0.01391 |
| $L_4$: | 1.61972 | 0.02252 |

What we claim as our invention, and desire to secure by Letters Patent, is—

Chromatically and spherically corrected tele-photographic objective consisting of a positive cemented double lens in front and a negative cemented double lens behind, the focal length of the positive double lens exceeding that of the negative one, and each of both double lenses being chromatically corrected, but having a spherical error of the order of magnitude and of the sign of a simple lens which has the same focal length positive and negative respectively.

In testimony whereof we have signed our names to this specification in the presence of two subscribing witnesses.

PAUL RUDOLPH.
　　　　ERNST WANDERSLEB.

Witnesses:
　　PAUL KRÜGER,
　　FRITZ SANDER.